(12) United States Patent
Yu et al.

(10) Patent No.: US 11,997,641 B2
(45) Date of Patent: May 28, 2024

(54) CONTROL INFORMATION TRANSMISSION METHOD, BASE STATION, AND USER EQUIPMENT

(71) Applicant: HUAWEI TECHNOLOGIES CO., LTD., Guangdong (CN)

(72) Inventors: Zheng Yu, Beijing (CN); Xiangsheng Guan, Nanjing (CN); Li Chen, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/273,814

(22) Filed: Feb. 12, 2019

(65) Prior Publication Data
US 2019/0182802 A1 Jun. 13, 2019

Related U.S. Application Data

(63) Continuation of application No. PCT/CN2016/094929, filed on Aug. 12, 2016.

(51) Int. Cl.
*H04W 72/14* (2009.01)
*H04L 1/00* (2006.01)
(Continued)

(52) U.S. Cl.
CPC .......... *H04W 68/02* (2013.01); *H04L 1/0003* (2013.01); *H04L 1/0009* (2013.01);
(Continued)

(58) Field of Classification Search
CPC ... H04W 68/02; H04W 4/06; H04W 72/1289; H04W 76/11; H04W 4/70; H04W 8/26; H04L 1/0003; H04L 1/0009; H04L 12/189
See application file for complete search history.

(56) References Cited

U.S. PATENT DOCUMENTS 10,560,920 B2 * 2/2020 Xu .................. H04W 72/12
2010/0188984 A1 * 7/2010 Futagi .................. H04L 5/0058
370/252

(Continued)

FOREIGN PATENT DOCUMENTS

CN 101867880 A 10/2010
CN 101959131 A 1/2011
(Continued)

OTHER PUBLICATIONS

"3GPP TS 36.212 v13.2.0", Jun. 2016) (Year: 2016).*
(Continued)

*Primary Examiner* — John D Blanton
(74) *Attorney, Agent, or Firm* — Leydig, Voit & Mayer, Ltd,

(57) ABSTRACT

A control information communication method, a base station, and user equipment are provided. A determination is made whether downlink control information (DCI) is used for multicast transmission or for paging. When the DCI is determined to be used for multicast transmission, the DCI is scrambled by using a single cell radio network temporary identifier (SC-RNTI). The DCI includes indication information and scheduling information, the indication information indicating whether a multicast control channel is updated. When the DCI is determined to be used for paging, the DCI is scrambled by using a paging radio network temporary identifier (P-RNTI). The scrambled DCI can be sent to user equipment by using a first downlink control information format.

11 Claims, 4 Drawing Sheets

(51) Int. Cl.
  *H04L 12/18* (2006.01)
  *H04W 4/06* (2009.01)
  *H04W 68/02* (2009.01)
  *H04W 72/23* (2023.01)
  *H04W 76/11* (2018.01)
  *H04W 4/70* (2018.01)
  *H04W 8/26* (2009.01)
  *H04W 72/30* (2023.01)

(52) U.S. Cl.
  CPC ............ *H04L 12/189* (2013.01); *H04W 4/06* (2013.01); *H04W 72/23* (2023.01); *H04W 76/11* (2018.02); *H04W 4/70* (2018.02); *H04W 8/26* (2013.01); *H04W 72/30* (2023.01)

(56) References Cited

U.S. PATENT DOCUMENTS

| | | | |
|---|---|---|---|
| 2011/0038299 A1 | 2/2011 | Sugawara et al. | |
| 2011/0243066 A1* | 10/2011 | Nayeb Nazar | H04L 5/0016 370/328 |
| 2012/0127913 A1 | 5/2012 | Lin et al. | |
| 2013/0294315 A2 | 11/2013 | Gou et al. | |
| 2015/0016326 A1 | 1/2015 | Wang et al. | |
| 2017/0164407 A1 | 6/2017 | Yang et al. | |
| 2018/0049176 A1* | 2/2018 | Park | H04L 5/0044 |
| 2018/0069593 A1* | 3/2018 | Yi | H04L 5/003 |
| 2018/0234826 A1* | 8/2018 | Määttanen | H04W 4/90 |
| 2018/0242278 A1* | 8/2018 | Xu | H04W 72/12 |
| 2019/0174474 A1* | 6/2019 | Zhang | H04W 68/005 |
| 2019/0223197 A1* | 7/2019 | Shin | H04L 1/0031 |
| 2019/0246254 A1* | 8/2019 | Chatterjee | H04W 76/11 |
| 2021/0235479 A1* | 7/2021 | Tang | H04L 27/2666 |

FOREIGN PATENT DOCUMENTS

| | | |
|---|---|---|
| CN | 101998246 A | 3/2011 |
| CN | 102035807 A | 4/2011 |
| CN | 102158959 A | 8/2011 |
| CN | 102685821 A | 9/2012 |
| EP | 3500035 A1 | 6/2019 |
| JP | 2012525731 A | 10/2012 |
| JP | 2013500643 A | 1/2013 |
| WO | 2009131087 A1 | 10/2009 |
| WO | 2010118659 A1 | 10/2010 |
| WO | 2015199491 A1 | 12/2015 |
| WO | 2016070764 A1 | 5/2016 |

OTHER PUBLICATIONS

Huawei et al., "SC-PTM configuration and operation",3GPP TSG-RAN WG2 Meeting #91 R2-153378,Beijing, China, Aug. 24-28, 2015,total 6 pages.

Huawei , "Summary of email discussion: [91#22][LTE/SC-PTM] Scheduling pattern, DRX and Change Notification",3GPP TSG-RAN WG2 #91bis R2-154195,Malmo, Sweden, Oct. 5-9, 2015,total 10 pages.

Huawei et al., "FDD-TDD differentiation for SC-PTM capabilities",3GPP TSG RAN WG2 Meeting #93bis R2-162270, Dubrovnik, Croatia, Apr. 11-15, 2016,total 2 pages.

3GPP TS 36.212 V13.2.0 (Jun. 2016);3rd Generation Partnership Project;Technical Specification Group Radio Access Network;Evolved Universal Terrestrial Radio Access (E-UTRA);Multiplexing and channel coding(Release 13),total 140 pages.

3GPP TSG-RAN WG2 Meeting #91bis,R3-154551,:"SC-PTM Configuration",Qualcomm Incorporated,Malmo, Sweden, Oct. 5-9, 2015,total 3 pages.

* cited by examiner

CONTROL INFORMATION TRANSMISSION METHOD, BASE STATION, AND USER EQUIPMENT

CROSS-REFERENCE TO RELATED APPLICATIONS

This application is a continuation of international application no. PCT/CN2016/094929, filed on Aug. 12, 2016, the disclosure of which is hereby incorporated by reference in its entirety.

TECHNICAL FIELD

Embodiments of the present disclosure relate to the field of communications, and in particular, to a control information transmission method, a base station, and user equipment.

BACKGROUND

In the prior art, a single-cell point to multipoint (SC-PTM) mechanism is used in multicast communication. In a current SC-PTM mechanism, a system information block (SIB) 20 includes some configuration information of a single-cell multicast control channel (SC-MCCH), and user equipment (UE) receives the SC-MCCH based on the configuration included in the SIB20.

In the prior art, the UE needs to first receive a control channel used to schedule a physical downlink shared data channel (PDSCH). The PDSCH carries the SC-MCCH. After successfully detecting the control channel, the UE further detects a data channel carrying the SC-MCCH. When the UE successfully detects the data channel, the UE learns configuration information of a single-cell multicast traffic channel (SC-MTCH) included in the SC-MCCH. Then, the UE needs to detect the control channel scheduling the PDSCH. The PDSCH carries the SC-MTCH. After successfully detecting the control channel, the UE further detects a data channel carrying the SC-MTCH. The SC-MTCH includes multicast information used for communication between a base station and the UE.

In an actual process of SC-PTM multicast communication, the SC-MCCH may be updated. In the prior art, a single control channel usually needs to be sent before the control channel of the SC-MCCH is scheduled. The single control channel is used to indicate whether the SC-MCCH is updated. If the control channel indicates that the SC-MCCH is updated, the UE receives the SC-MCCH and the SC-MTCH by using the foregoing method.

For example, in the prior art, in the method indicating the update of the SC-MCCH, if information related to the SC-MCCH changes, a single PDCCH needs to be transmitted. The PDCCH notifies the update of the SC-MCCH by using a format 1C.

Therefore, an update indication indicating whether the SC-MCCH is updated needs to be sent by using a single control channel. In this way, if the UE needs to receive a PDSCH including an SC-MTCH, the UE may need to receive a plurality of control channels and a plurality of data channels. Especially, for UE having an enhanced coverage, each control channel or each data channel or both need to be repeatedly transmitted for a plurality of times, to ensure reliable communication. In this way, communication resources of a system are greatly occupied by coverage enhancement transmission of the plurality of control channels and coverage enhancement transmission of the plurality of data channels, complexity of performing detection by the UE is high, power consumption overheads of the UE is substantially increased.

SUMMARY

Embodiments of the disclosure provide a control information communication method, a base station, and user equipment, so that multicast information communication can be simplified, complexity of performing detection by the user equipment can be reduced and power consumption overheads of the user equipment can be reduced, and resource utilization can be optimized.

According to a first aspect, an embodiment of the present disclosure provides a control information communication method. The control information communication method includes:

adding indication information into downlink control information, where the indication information is used to indicate whether a multicast control channel is updated and/or whether a multicast traffic channel is updated;

adding scheduling information used to schedule a multicast channel into the downlink control information, where the multicast channel includes the multicast control channel and/or the multicast traffic channel; and sending the downlink control information to user equipment by using a first downlink control information format.

In this embodiment of the disclosure, a base station may add both the scheduling information and the indication information into the downlink control information. Therefore, there is no need to use a single channel to indicate whether the multicast control channel is updated and/or whether the multicast traffic channel is updated, so that indication of the update of the multicast channel can be simplified, complexity of performing detection by the user equipment can be reduced and power consumption overheads of the user equipment can be reduced, and resource utilization can be optimized.

With reference to the first aspect, in a first possible implementation of the first aspect, the first downlink control information format includes a downlink control information format DCI format 6-2; or the first downlink control information format includes a downlink control information format supported by machine type communication MTC user equipment, and the MTC user equipment includes bandwidth-reduced user equipment and/or coverage-enhanced user equipment.

With reference to the first aspect, in a second possible implementation of the first aspect, the indication information includes first information occupying one bit, and the first information with a state of 1 indicates that the multicast control channel is updated, or the first information with a state of 0 indicates that the multicast control channel is not updated; or the indication information includes second information occupying one bit, and the second information with a state of 0 indicates that the multicast control channel is updated, or the second information with a state of 1 indicates that the multicast control channel is not updated.

With reference to the first aspect or the first possible or the second possible implementation of the first aspect, in a third possible implementation of the first aspect, the scheduling information includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

With reference to the first aspect or the third possible implementation of the first aspect, in a fourth possible implementation of the first aspect, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

With reference to the first aspect or the third possible implementation of the first aspect, in a fifth possible implementation of the first aspect, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

With reference to the third possible implementation of the first aspect, in a sixth possible implementation of the first aspect, there is a first association relationship between the resource block allocation of the multicast control channel and the resource block allocation of the multicast traffic channel; and/or there is a second association relationship between the modulation and coding scheme of the multicast control channel and the modulation and coding scheme of the multicast traffic channel; and/or there is a third association relationship between the transmission block size of the multicast control channel and the transmission block size of the multicast traffic channel; and/or there is a fourth association relationship between the quantity of repetitions of the multicast control channel and the quantity of repetitions of the multicast traffic channel.

With reference to the sixth possible implementation of the first aspect, in a seventh possible implementation of the first aspect, the scheduling information further includes association information, where the association information indicates one or more of the first association relationship, the second association relationship, the third association relationship, and the fourth association relationship.

With reference to the first aspect or any one of the first to the seventh possible implementation of the first aspect, in an eighth possible implementation of the first aspect, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

With reference to the first aspect or the first to the seventh possible implementation of the first aspect, in a ninth possible implementation of the first aspect, the method further includes:

when the multicast channel includes only the multicast traffic channel, sending, to the user equipment, a system information block used to schedule the multicast control channel, or sending, to the user equipment, a system information block into which the multicast control channel is added.

According to a second aspect, an embodiment of the present disclosure provides a control information communication method. The control information communication method includes:

receiving, by using a first downlink control information format, downlink control information sent by a base station;

obtaining indication information from the downlink control information, where the indication information is used to indicate whether a multicast control channel is updated and/or whether a multicast traffic channel is updated; and obtaining, from the downlink control information, scheduling information used to schedule a multicast channel, where the multicast channel includes the multicast control channel and/or the multicast traffic channel.

In this embodiment of the present disclosure, user equipment may detect both the scheduling information and the indication information in the downlink control information. Therefore, there is no need to use a single channel to indicate whether the multicast control channel is updated and/or whether the multicast traffic channel is updated, so that indication of the update of the multicast channel can be simplified, complexity of performing detection by the user equipment can be reduced and power consumption overheads of the user equipment can be reduced, and resource utilization can be optimized.

With reference to the second aspect, in a first possible implementation of the second aspect, the first downlink control information format includes a downlink control information format DCI format 6-2; or the first downlink control information format includes a downlink control information format supported by machine type communication MTC user equipment, and the MTC user equipment includes bandwidth-reduced user equipment and/or coverage-enhanced user equipment.

Because a control channel of multicast information communication may be implemented based on the DCI format 6-2, downlink control information communication may be implemented by using an already existing DCI format.

With reference to the second aspect, in a second possible implementation of the second aspect, the indication information includes first information occupying one bit, and the first information with a state of 1 indicates that the multicast control channel is updated, or the first information with a state of 0 indicates that the multicast control channel is not updated; or the indication information includes second information occupying one bit, and the second information with a state of 0 indicates that the multicast control channel is updated, or the second information with a state of 1 indicates that the multicast control channel is not updated.

With reference to the second aspect or the first possible or the second possible implementation of the second aspect, in a third possible implementation of the second aspect, the scheduling information includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

With reference to the second aspect or the third possible implementation of the second aspect, in a fourth possible implementation of the second aspect, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

With reference to the second aspect or the third possible implementation of the second aspect, in a fifth possible implementation of the second aspect, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

With reference to the third possible implementation of the second aspect, in a sixth possible implementation of the second aspect, the obtaining, from the downlink control information, scheduling information used to schedule a multicast channel includes:

determining the resource block allocation of the multicast traffic channel based on a first association relationship and the resource block allocation of the multicast control channel, or determining the resource block allocation of the multicast control channel based on a first association relationship and the resource block allocation of the multicast traffic channel, where the first association relationship is an association relationship between the resource block allocation of the multicast control channel and the resource block allocation of the multicast traffic channel; and/or determining the modulation and coding scheme of the multicast traffic channel based on a second association relationship and the modulation and coding scheme of the multicast control channel, or determining the modulation and coding scheme of the multicast control channel based on a second association relationship and the modulation and coding scheme of the multicast traffic channel, where the second association relationship is an association relationship between the modulation and coding scheme of the multicast control channel and the modulation and coding scheme of the multicast traffic channel; and/or determining the transmission block size of the multicast traffic channel based on a third association relationship and the transmission block size of the multicast control channel, or determining the transmission block size of the multicast control channel based on a third association relationship and the transmission block size of the multicast traffic channel, where the third association relationship is an association relationship between the transmission block size of the multicast control channel and the transmission block size of the multicast traffic channel; and/or determining the quantity of repetition times of the multicast traffic channel based on a fourth association relationship and the quantity of repetition times of the multicast control channel, or determining the quantity of repetition times of the multicast control channel based on a fourth association relationship and the quantity of repetition times of the multicast traffic channel, where the fourth association relationship is an association relationship between the quantity of repetition times of the multicast control channel and the quantity of repetition times of the multicast traffic channel.

With reference to the sixth possible implementation of the second aspect, in a seventh possible implementation of the second aspect, the scheduling information further includes association information, where the association information indicates one or more of the first association relationship, the second association relationship, the third association relationship, and the fourth association relationship.

With reference to the second aspect or the first to the seventh possible implementation of the second aspect, in an eighth possible implementation of the second aspect, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

With reference to the second aspect or the first to the seventh possible implementation of the second aspect, in a ninth possible implementation of the second aspect, the method further includes:

when the multicast channel includes only the multicast traffic channel, receiving a system information block used to schedule the multicast control channel, and receiving the multicast control channel based on the scheduling performed by using the system information block; or receiving a system information block into which the multicast control channel is added, and obtaining the multicast control channel from the system information block.

According to a third aspect, an embodiment of the present disclosure provides a base station. The base station includes:

an indication information determining module, configured to add indication information into downlink control information, where the indication information is used to indicate whether a multicast control channel is updated and/or whether a multicast traffic channel is updated;

a scheduling information determining module, configured to add scheduling information used to schedule a multicast channel into the downlink control information, where the multicast channel includes the multicast control channel and/or the multicast traffic channel; and a sending module, configured to send the downlink control information to user equipment by using a first downlink control information format.

In this embodiment of the present disclosure, the base station may add both the scheduling information and the indication information into the downlink control information. Therefore, there is no need to use a single channel to indicate whether the multicast control channel is updated and/or whether the multicast traffic channel is updated, so that indication of the update of the multicast channel can be simplified, complexity of performing detection by the user equipment can be reduced and power consumption overheads of the user equipment can be reduced, and resource utilization can be optimized.

With reference to the third aspect, in a first possible implementation of the third aspect, the first downlink control information format used by the sending module includes a downlink control information format DCI format 6-2, or the first downlink control information format includes a downlink control information format supported by machine type communication MTC user equipment, and the MTC user equipment includes bandwidth-reduced user equipment and/or coverage-enhanced user equipment.

With reference to the third aspect, in a second possible implementation of the third aspect, the indication information determined by the indication information determining module includes first information occupying one bit, and the first information with a state of 1 indicates that the multicast control channel is updated, or the first information with a state of 0 indicates that the multicast control channel is not updated; or the indication information includes second information occupying one bit, and the second information with a state of 0 indicates that the multicast control channel is updated, or the second information with a state of 1 indicates that the multicast control channel is not updated.

With reference to the third aspect or the first possible or the second possible implementation of the third aspect, in a third possible implementation of the third aspect, the scheduling information determined by the scheduling information determining module includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

With reference to the third aspect or the third possible implementation of the third aspect, in a fourth possible implementation of the third aspect, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

With reference to the third aspect or the third possible implementation of the third aspect, in a fifth possible implementation of the third aspect, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

With reference to the third possible implementation of the third aspect, in a sixth possible implementation of the third aspect, there is a first association relationship between the resource block allocation of the multicast control channel and the resource block allocation of the multicast traffic channel; and/or there is a second association relationship between the modulation and coding scheme of the multicast control channel and the modulation and coding scheme of the multicast traffic channel; and/or there is a third association relationship between the transmission block size of the multicast control channel and the transmission block size of the multicast traffic channel; and/or there is a fourth association relationship between the quantity of repetitions of the multicast control channel and the quantity of repetitions of the multicast traffic channel.

With reference to the sixth possible implementation of the third aspect, in a seventh possible implementation of the third aspect, the scheduling information determined by the scheduling information determining module further includes association information, where the association information indicates one or more of the first association relationship, the second association relationship, the third association relationship, and the fourth association relationship.

With reference to the third aspect or the first to the seventh possible implementation of the third aspect, in an eighth possible implementation of the third aspect, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

With reference to the third aspect or the first to the seventh possible implementation of the third aspect, in a ninth possible implementation of the third aspect, the sending module is further configured to: when the multicast channel includes only the multicast traffic channel, send, to the user equipment, a system information block used to schedule the multicast control channel, or send, to the user equipment, a system information block into which the multicast control channel is added.

According to a fourth aspect, an embodiment of the present disclosure provides user equipment. The user equipment includes:

a receiving module, configured to receive, by using a first downlink control information format, downlink control information sent by a base station;

an indication information obtaining module, configured to obtain indication information from the downlink control information, where the indication information is used to indicate whether a multicast control channel is updated and/or whether a multicast traffic channel is updated; and a scheduling information obtaining module, configured to obtain, from the downlink control information, scheduling information used to schedule a multicast channel, where the multicast channel includes the multicast control channel and/or the multicast traffic channel.

In this embodiment of the present disclosure, the user equipment may detect both the scheduling information and the indication information in the downlink control information. Therefore, there is no need to use a single channel to indicate whether the multicast control channel is updated and/or whether the multicast traffic channel is updated, so that indication of the update of the multicast channel can be simplified, complexity of performing detection by the user equipment can be reduced and power consumption overheads of the user equipment can be reduced, and resource utilization can be optimized.

With reference to the fourth aspect, in a first possible implementation of the fourth aspect, the first downlink control information format used by the receiving module includes a downlink control information format DCI format 6-2, or the first downlink control information format includes a downlink control information format supported by machine type communication MTC user equipment, and the MTC user equipment includes bandwidth-reduced user equipment and/or coverage-enhanced user equipment.

With reference to the fourth aspect, in a second possible implementation of the fourth aspect, the indication information obtained by the indication information obtaining module includes first information occupying one bit, and the first information with a state of 1 indicates that the multicast control channel is updated, or the first information with a state of 0 indicates that the multicast control channel is not updated; or the indication information includes second information occupying one bit, and the second information with a state of 0 indicates that the multicast control channel is updated, or the second information with a state of 1 indicates that the multicast control channel is not updated.

With reference to the fourth aspect or the first possible or the second possible implementation of the fourth aspect, in a third possible implementation of the fourth aspect, the scheduling information obtained by the scheduling information obtaining module includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

With reference to the fourth aspect or the third possible implementation of the fourth aspect, in a fourth possible implementation of the fourth aspect, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

With reference to the fourth aspect or in the third possible implementation of the fourth aspect, in a fifth possible implementation of the fourth aspect, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

With reference to the third possible implementation of the fourth aspect, in a sixth possible implementation of the fourth aspect, the scheduling information obtaining module is specifically configured to: determine the resource block allocation of the multicast traffic channel based on a first association relationship and the resource block allocation of the multicast control channel, or determine the resource block allocation of the multicast control channel based on a first association relationship and the resource block allocation of the multicast traffic channel, where the first association relationship is an association relationship between the resource block allocation of the multicast control channel and the resource block allocation of the multicast traffic channel; and/or determine the modulation and coding scheme of the multicast traffic channel based on a second association relationship and the modulation and coding scheme of the multicast control channel, or determine the modulation and coding scheme of the multicast control channel based on a second association relationship and the modulation and coding scheme of the multicast traffic channel, where the second association relationship is an association relationship between the modulation and coding scheme of the multicast control channel and the modulation and coding scheme of the multicast traffic channel; and/or determine the transmission block size of the multicast traffic channel based on a third association relationship and the transmission block size of the multicast control channel, or determine the transmission block size of the multicast control channel based on a third association relationship and the transmission block size of the multicast traffic channel, where the third association relationship is an association relationship between the transmission block size of the multicast control channel and the transmission block size of the multicast traffic channel; and/or determine the quantity of repetition times of the multicast traffic channel based on a fourth association relationship and the quantity of repetition times of the multicast control channel, or determine the quantity of repetition times of the multicast control channel based on a fourth association relationship and the quantity of repetition times of the multicast traffic channel, where the fourth association relationship is an association relationship between the quantity of repetition times of the multicast control channel and the quantity of repetition times of the multicast traffic channel.

With reference to the sixth possible implementation of the fourth aspect, in a seventh possible implementation of the fourth aspect, the scheduling information further includes association information, where the association information indicates one or more of the first association relationship, the second association relationship, the third association relationship, and the fourth association relationship.

With reference to the fourth aspect or the first to the seventh possible implementation of the fourth aspect, in an eighth possible implementation of the fourth aspect, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

With reference to the fourth aspect or the first to the seventh possible implementation of the fourth aspect, in a ninth possible implementation of the fourth aspect, the receiving module is further configured to: when the multicast channel includes only the multicast traffic channel, receive a system information block used to schedule the multicast control channel, and receive the multicast control channel based on the scheduling performed by using the system information block; or receive a system information block into which the multicast control channel is added, and obtain the multicast control channel from the system information block.

DESCRIPTION OF EMBODIMENTS

Figure 1:
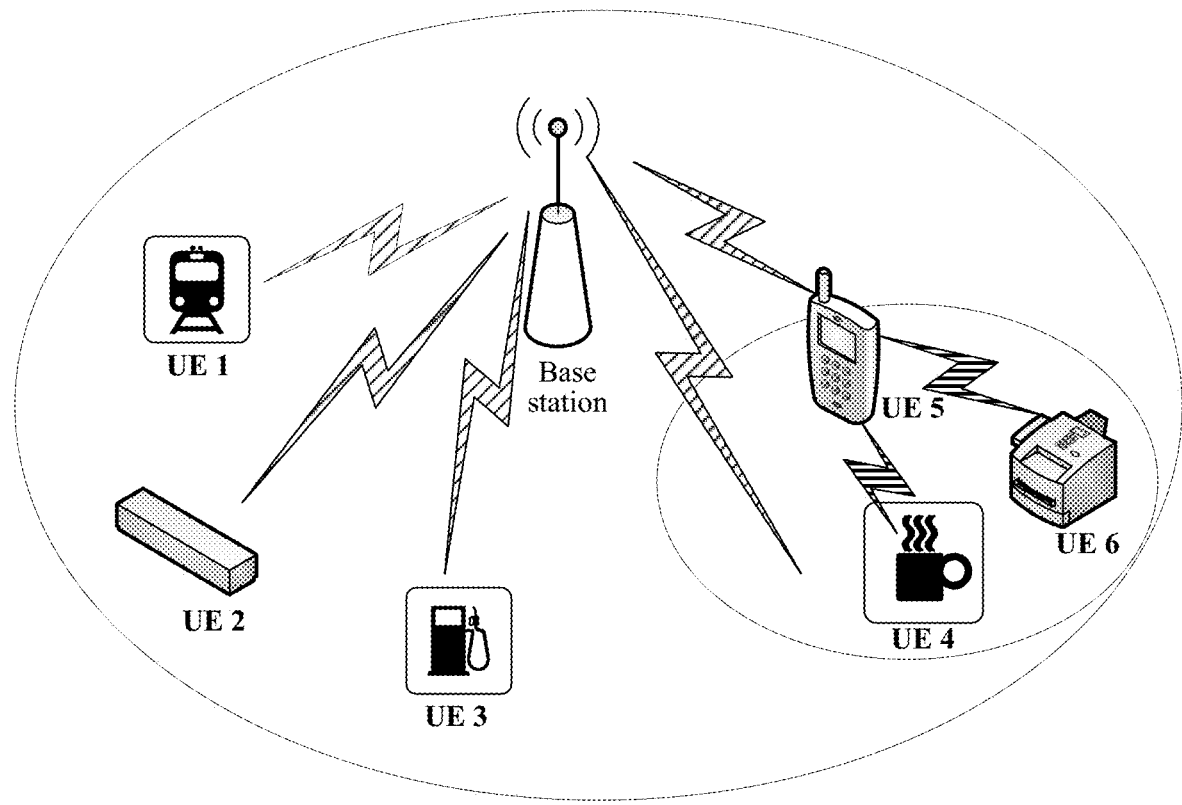
FIG. 1 is a system architectural diagram of a communications system to which a control information communication method is applied according to the present disclosure.

Embodiments of the present disclosure provide a control information communication method, a base station, and user equipment, so that multicast channel communication can be simplified, complexity of performing detection by the user equipment can be reduced and power consumption overheads of the user equipment can be reduced, and resource utilization can be optimized.

To make the disclosure objectives, features, and advantages of the present disclosure clearer and more comprehensible, the following clearly describes the technical solutions in the embodiments of the present disclosure with reference to the accompanying drawings in the embodiments of the present disclosure. Apparently, the embodiments described in the following are merely some rather than all of the embodiments of the present disclosure. All other embodiments obtained by persons skilled in the art based on the embodiments of the present disclosure shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

A system architecture to which the control information communication method of the present disclosure is applied is briefly described first. The present disclosure is mainly applied to an LTE system or a Long Term Evolution Advanced (LTE-A, LTE Advanced) system. The present disclosure may also be applied to another communications system, such as a Wideband Code Division Multiple Access (WCDMA) system, or a Time Division-Synchronous Code Division Multiple Access (TD-SCDMA) system, provided that the communications system includes an entity capable of sending information and another entity capable of receiving information.

Communication in the embodiments of the present disclosure may be sending or receiving. During communication, if processing of a device on one side is sending, processing of a communications device on the other side that corresponds to the device on the one side is receiving; or if processing of a device on one side is receiving, processing of a communications device on the other side that corresponds to the device on the one side is sending. A coverage enhancement in the embodiments of the present disclosure may be one or more of repeated transmission, spread spectrum transmission, retransmission, time interval bundling transmission, narrowband (for example, sub-carrier scheduling) transmission, ultra-narrowband (for example, a bandwidth ranges from tens of hertz to tens of kilohertz) transmission, power-spectrum-density-enhanced transmission, demand-reduced transmission, and continuously-tried transmission. A low-cost terminal or a low-complexity-degree terminal refers to a terminal device having an operating bandwidth less than an operating bandwidth of a non-low-cost terminal or a non-low-complexity-degree terminal. An operating bandwidth may be one or more of a processing bandwidth, a radio-frequency processing bandwidth, and a baseband processing bandwidth. For example, the operating bandwidth is 1.4 MHz (or 200 KHz, or 180 KHz). The operating bandwidth is a frequency resource having a particular frequency bandwidth. The operating bandwidth may include one or more sub-carriers (for example, a size of a sub-carrier is 15 KHz, or 2.5 KHz, or 3.75 KHz), or may include one or more resource blocks.

Referring to FIG. 1, FIG. 1 is a system architectural diagram of a communications system to which a control information communication method in the present disclosure is applied. As shown in FIG. 1, a base station and user equipment (UE) 1 to UE 6 constitute a communications system. In the communications system, the base station sends one or more of system information, an RAR message, and a paging message to one or more of the UE 1 to UE 6. The base station is a transmit end device in the control information communication method of the present disclosure, and the UE 1 to UE 6 are receive end devices in the control information communication method of the present disclosure. In addition, the UE 4 to the UE 6 also constitute a communications system. In the communications system, the UE 5 may apply a function of a base station, and the UE 5 may send one or more of system information, an RAR message, and a paging message to one or more of the UE 4 and the UE 6.

Detailed descriptions are provided below separately.

Figure 2:
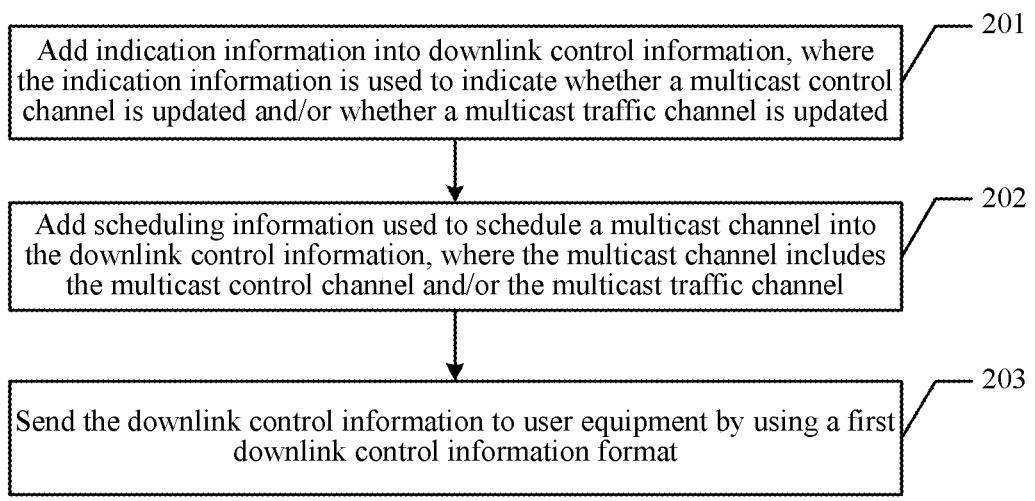
FIG. 2 is a schematic block flow diagram of a control information communication method according to an embodiment of the present disclosure.

An embodiment of the control information communication method of the present disclosure may be applied to a scenario in which a base station sends control information to UE, so that a multicast information communication procedure is optimized, steps of control information communication and/or data channel communication are reduced, and resource utilization is optimized. Referring to FIG. 2, the control information communication method may include the following steps.

201. Add indication information into downlink control information, where the indication information is used to indicate whether a multicast control channel is updated and/or whether a multicast traffic channel is updated.

In this embodiment of the present disclosure, the base station serves UE. The UE may specifically include machine type communication (MTC) user equipment, that is, low-complexity-degree user equipment, or low-power-consumption user equipment, or coverage-enhanced user equipment, or the like. Usually, an operating bandwidth supported by the low-complexity-degree user equipment or the low-power-consumption user equipment is less than an operating bandwidth of normal user equipment.

In this embodiment of the present disclosure, the multicast control channel may be an SC-MCCH or an MCCH, and the multicast traffic channel may be an SC-MTCH or an MTCH.

In a current application scenario, the multicast control channel may be updated or the multicast traffic channel may be updated. The update of the channel usually needs to be indicated by using a single channel. In this embodiment of the present disclosure, the update of the channel is no longer indicated by using a single channel, but is indicated by using the downlink control information. For example, in the case that an SC-MCCH is updated, or an allocated MBMS session changes or an allocated radio resource changes, the base station may generate an indication information, the indication information indicates that the SC-MCCH is updated, and the base station adds the indication information into the downlink control information. In addition, the indication information may also indicate the update of the multicast traffic channel. As illustrated below, the control channel used for the multicast information communication includes an update indication of the SC-MCCH (and/or the SC-MTCH). For example, one bit in the control channel used for the multicast information communication is used as the indication information, and the indication information is used to indicate whether the SC-MCCH (and/or the SC-MTCH) is updated.

In some embodiments of the present disclosure, the indication information includes first information occupying one bit, and when the first information is in a state of 1, it indicates that the multicast control channel is updated, or when the first information is in a state of 0, it indicates that the multicast control channel is not updated; or the indication information includes second information occupying one bit, and when the second information is in a state of 0, it indicates that the multicast control channel is updated, or when the second information is in a state of 1, it indicates that the multicast control channel is not updated.

202. Add scheduling information used to schedule a multicast channel into the downlink control information, where the multicast channel includes the multicast control channel and/or the multicast traffic channel.

In this embodiment of the present disclosure, in addition to the foregoing indication information, the scheduling information may also be added into the downlink control information, and the scheduling information is used to schedule the multicast channel. Specifically, the multicast channel is the multicast control channel and/or the multicast traffic channel. The scheduling information may be used to schedule the multicast control channel or may be used to schedule the multicast traffic channel. It can be learned from the descriptions in the foregoing steps that, in this embodiment of the present disclosure, the base station may add both the scheduling information and the indication information into the downlink control information, and therefore whether the multicast control channel is updated and/or whether the multicast traffic channel is updated does not need to be indicated by using a single channel, so that resource utilization can be optimized.

In some embodiments of the present disclosure, the scheduling information includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

For example, the control channel used for the multicast information communication may further include scheduling information used to schedule the multicast control channel, and the scheduling information used to schedule the multicast control channel may include one or more of the resource block allocation of the multicast control channel, the modulation and coding scheme (or the transmission block size) of the multicast control channel, the quantity of repetitions of the multicast control channel, and a quantity of repetitions of a DCI subframe.

Further, in some embodiments of the present disclosure, when the scheduling information is used to schedule the multicast control channel, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

The foregoing appropriately describes only the possible implementations of the scheduling information by using examples, but the present disclosure is not limited thereto.

Further, in some embodiments of the present disclosure, when the scheduling information is used to schedule the multicast traffic channel, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

The foregoing appropriately describes only the possible implementations of the scheduling information by using examples, but the present disclosure is not limited thereto.

In some embodiments of the present disclosure, there is an association relationship between the scheduling of the multicast control channel and the scheduling of the multicast traffic channel. For example, there is a first association relationship between the resource block allocation of the multicast control channel and the resource block allocation of the multicast traffic channel; and/or there is a second association relationship between the modulation and coding scheme of the multicast control channel and the modulation and coding scheme of the multicast traffic channel; and/or there is a third association relationship between the transmission block size of the multicast control channel and the transmission block size of the multicast traffic channel; and/or there is a fourth association relationship between the quantity of repetitions of the multicast control channel and the quantity of repetitions of the multicast traffic channel.

The association relationship between the scheduling of the multicast control channel and the scheduling of the multicast traffic channel is not limited to the foregoing examples. A system may pre-specify one or more of the first association relationship, the second association relationship, the third association relationship, and the fourth association relationship. The base station may also indicate or configure one or more of the first association relationship, the second association relationship, the third association relationship, and the fourth association relationship. The base station may determine, by using the foregoing association relationship, how to schedule the multicast control channel and the multicast traffic channel. In addition, the user equipment may determine, by using the foregoing association relationship, how to receive the multicast control channel and the multicast traffic channel.

As illustrated below, the SC-MCCH and the SC-MTCH may be transmitted by using same resource block allocation, that is, a same narrowband resource. Alternatively, the resource block allocation in the DCI used for the multicast information communication indicates a narrowband of SC-MCCH transmission, and a narrowband of SC-MTCH transmission is determined based on the narrowband of the SC-MCCH transmission. For example, the narrowband of the SC-MTCH transmission is obtained by adding a narrowband shift to the narrowband of the SC-MCCH transmission. The narrowband shift indicates an offset from the narrowband of the SC-MCCH transmission to the narrowband of the SC-MTCH transmission, and a value of the narrowband shift is pre-specified by a system or is configured by using signaling. For example, if the resource block allocation in the DCI used for the multicast information communication indicates that the narrowband used in the SC-MCCH transmission is a narrowband n, and the narrowband shift is k, an index of the narrowband in the SC-MTCH transmission is n+k.

Further, in some embodiments of the present disclosure, the scheduling information in the DCI further includes the association information. The association information indicates one or more of the first association relationship, the second association relationship, the third association relationship, and the fourth association relationship. That is, the base station may further send one or more of the first association relationship, the second association relationship, the third association relationship, and the fourth association relationship to the user equipment by using the scheduling information, so that the user equipment can obtain one or more of the first association relationship, the second association relationship, the third association relationship, and the fourth association relationship by using the scheduling information.

In some embodiments of the present disclosure, the scheduling information includes N bits, a state of each of the N bits is the same as a bit state of the indication information, and N is a positive integer greater than or equal to 1. Alternatively, the scheduling information includes N bits, a state of each of the N bits is a bit state having a fixed value, and N is a positive integer greater than or equal to 1.

As illustrated below, if it is assumed that DCI used to schedule the SC-MCCH includes 13 bits (including one bit of SC-MCCH update indication), and the bit state of the SC-MCCH update indication is 0, the DCI of the SC-MCCH includes 13 zeros. If it is assumed that DCI used to schedule the SC-MCCH includes 13 bits (including one bit of SC-MCCH update indication), and the bit state of the SC-MCCH update indication is 1, the DCI of the SC-MCCH includes 13 ones. States of N bits are the same as a bit state of the indication information, or states of N bits have a fixed value, so that repeated transmission of the indication information or check of the DCI transmission may be implemented, and reliability of the indication information communication is improved and a false alarm probability is reduced.

In some embodiments of the present disclosure, in addition to the foregoing steps, the control information communication method of the present disclosure may further include the following step:

when the multicast channel includes only the multicast traffic channel, sending, to the user equipment, a system information block used to schedule the multicast control channel, or sending, to the user equipment, a system information block into which the multicast control channel is added.

When the multicast channel includes only the multicast traffic channel, that is, the scheduling information in step 202 can only be used to schedule the multicast traffic channel, in this implementation scenario, this embodiment of the present disclosure further describes how to schedule the multicast control channel. For example, the multicast control channel may be scheduled by using the system information block. Alternatively, to reduce the steps of the multicast information communication, the multicast control channel is directly added into the system information block. In this way, after receiving the system information block sent by the base station, the user equipment may obtain the multicast control channel in the system information block.

203. Send the downlink control information to user equipment by using a first downlink control information format.

In this embodiment of the present disclosure, the foregoing indication information and the foregoing scheduling information are added into the downlink control information, and the base station may send the downlink control information to the user equipment by using the first downlink control information format. The user equipment may receive the downlink control information based on a pre-configured or pre-specified first downlink control information format. By parsing the received downlink control information, the user equipment may obtain the indication information and the scheduling information, so that overheads caused by detecting different channels for a plurality of times by the user equipment are reduced, resource utilization efficiency is improved, and an information communication delay is reduced.

In some embodiments of the present disclosure, the first downlink control information format includes a downlink control information format (DCI format) 6-2. Alternatively, the first downlink control information format includes a downlink control information format supported by machine type communication MTC user equipment. The MTC user equipment includes bandwidth-reduced user equipment and/or coverage-enhanced user equipment. In this embodiment of the present disclosure, the first downlink control information format that may be used by the base station when sending the downlink control information may be specifically the DCI format 6-2. The DCI format 6-2 has a small load and supports repetition of a paging message. Therefore, the control channel used for the multicast information communication may be implemented based on the DCI format 6-2. For example, when the control channel relates to the multicast information communication, the control channel is scrambled by using a first RNTI. When the control channel relates to the paging message communication, the control channel is scrambled by using a paging radio network temporary identifier (P-RNTI). The first RNTI herein is an RNTI different from the P-RNTI. For example, the first RNTI is a single cell radio network temporary identifier (SC-RNTI) or a single cell notification radio network temporary identifier (SC-N-RNTI). In addition, in this embodiment of the present disclosure, the first downlink control information format that may be used by the base station when sending the downlink control information is the downlink control information format that can be supported by the MTC user equipment. The MTC user equipment may receive the downlink control information sent by the base station.

It can be learned from the foregoing embodiments, which are examples of the present disclosure, that the indication information is added into the downlink control information, where the indication information is used to indicate whether the multicast control channel is updated and/or whether the multicast traffic channel is updated; the scheduling information used to schedule the multicast channel is added into the downlink control information, where the multicast channel includes the multicast control channel and/or the multicast traffic channel; and finally the downlink control information is sent to the user equipment by using the first downlink control information format. In this embodiment of the present disclosure, the base station may add both the scheduling information and the indication information into the downlink control information. Therefore, there is no need to use a single channel to indicate whether the multicast control channel is updated and/or whether the multicast traffic channel is updated, so that indication of the update of the multicast channel can be simplified, complexity of performing detection by the user equipment can be reduced and power consumption overheads of the user equipment can be reduced, and resource utilization can be optimized.

Figure 3:
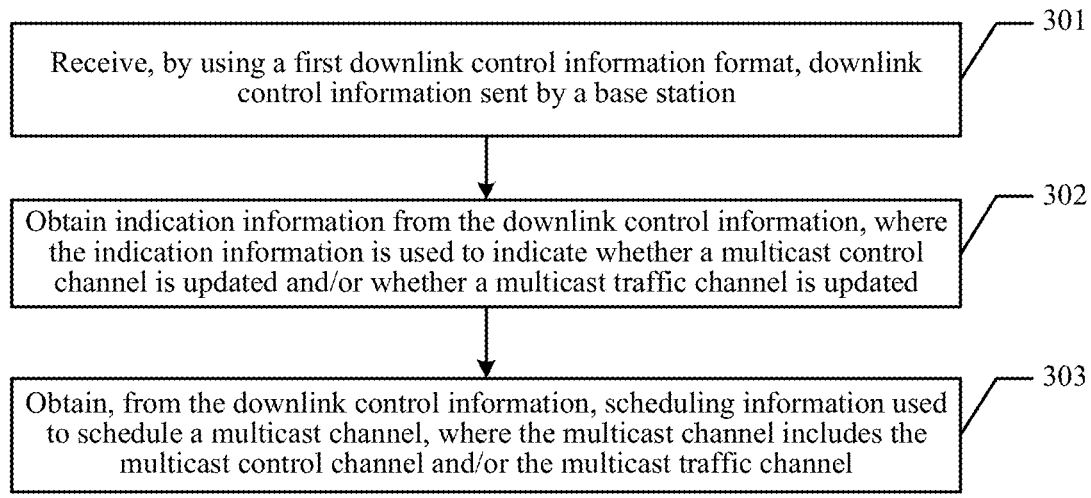
FIG. 3 is a schematic block flow diagram of another control information communication method according to an embodiment of the present disclosure.

The foregoing embodiments describe, from the base station side, the control information communication method provided in the embodiments of the present disclosure. The following describes, from a UE side, the control information communication method provided in the embodiments of the present disclosure. An embodiment of the control information communication method of the present disclosure may be applied to a scenario of how UE receives downlink control information. Referring to FIG. 3, the control information communication method may include the following steps.

301. Receive, by using a first downlink control information format, downlink control information sent by a base station.

In this embodiment of the present disclosure, the base station serves UE. The UE may specifically include MTC user equipment, that is, low-complexity-degree user equipment, or low-power-consumption user equipment, or coverage-enhanced user equipment, or the like. Usually, an operating bandwidth supported by the low-complexity-degree user equipment or the low-power-consumption user equipment is less than an operating bandwidth of normal user equipment. The user equipment receives, based on a pre-configured or pre-specified first downlink control information format, the downlink control information sent by the base station.

In some embodiments of the present disclosure, the first downlink control information format includes a downlink control information format (DCI format) 6-2. Alternatively, the first downlink control information format includes a downlink control information format supported by machine type communication MTC user equipment. The MTC user equipment includes bandwidth-reduced user equipment and/or coverage-enhanced user equipment. In this embodiment of the present disclosure, the first downlink control information format that may be used by the user equipment when receiving the downlink control information may be specifically the DCI format 6-2. The DCI format 6-2 has a small load and supports repetition of a paging message. Therefore, the control channel used for the multicast information communication may be implemented based on the DCI format 6-2.

302. Obtain indication information from the downlink control information, where the indication information is used to indicate whether a multicast control channel is updated and/or whether a multicast traffic channel is updated.

In this embodiment of the present disclosure, after the user equipment receives the downlink control information sent by the base station, the user equipment may then obtain the indication information by detecting the downlink control information. The user equipment may determine, by using the obtained indication information, whether the multicast control channel is updated and/or whether the multicast traffic channel is updated. The user equipment does not need to determine, by detecting a single control channel, whether the multicast control channel is updated and/or whether the multicast traffic channel is updated, thereby reducing complexity of performing detection by the user equipment.

In some embodiments of the present disclosure, the indication information includes first information occupying one bit, and when the first information is in a state of 1, it indicates that the multicast control channel is updated, or when the first information is in a state of 0, it indicates that the multicast control channel is not updated; or the indication information includes second information occupying one bit, and when the second information is in a state of 0, it indicates that the multicast control channel is updated, or when the second information is in a state of 1, it indicates that the multicast control channel is not updated.

303. Obtain, from the downlink control information, scheduling information used to schedule a multicast channel, where the multicast channel includes the multicast control channel and/or the multicast traffic channel.

In this embodiment of the present disclosure, in addition to the foregoing indication information, the user equipment may further obtain the scheduling information from the downlink control information. The scheduling information is used to schedule the multicast channel. Specifically, the multicast channel is the multicast control channel and/or the multicast traffic channel. The scheduling information may be used to schedule the multicast control channel or may be used to schedule the multicast traffic channel. It can be learned from the descriptions in the foregoing steps that, in this embodiment of the present disclosure, both the scheduling information and the indication information are added into the downlink control information received by the user equipment, and therefore the user equipment does not need to detect a single control channel to learn whether the multicast control channel is updated and/or whether the multicast traffic channel is updated. In this way, complexity of performing detection by the user equipment is reduced, power consumption overheads of the user equipment are reduced, and resource utilization of a system is optimized.

In some embodiments of the present disclosure, the scheduling information includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

For example, the control channel used for the multicast information communication may further include scheduling information used to schedule the multicast control channel, and the scheduling information used to schedule the multicast control channel may include one or more of the resource block allocation of the multicast control channel, the modulation and coding scheme (or the transmission block size) of the multicast control channel, the quantity of repetitions of the multicast control channel, and a quantity of repetitions of a DCI subframe.

Further, in some embodiments of the present disclosure, when the scheduling information is used to schedule the multicast control channel, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

The foregoing appropriately describes only the possible implementations of the scheduling information by using examples, but the present disclosure is not limited thereto.

Further, in some embodiments of the present disclosure, when the scheduling information is used to schedule the multicast traffic channel, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

The foregoing appropriately describes only the possible implementations of the scheduling information by using examples, but the present disclosure is not limited thereto.

In some embodiments of the present disclosure, step 303 of obtaining, from the downlink control information, scheduling information used to schedule a multicast channel includes:

determining the resource block allocation of the multicast traffic channel based on a first association relationship and the resource block allocation of the multicast control channel, or determining the resource block allocation of the multicast control channel based on a first association relationship and the resource block allocation of the multicast traffic channel, where the first association relationship is an association relationship between the resource block allocation of the multicast control channel and the resource block allocation of the multicast traffic channel; and/or determining the modulation and coding scheme of the multicast traffic channel based on a second association relationship and the modulation and coding scheme of the multicast control channel, or determining the modulation and coding scheme of the multicast control channel based on a second association relationship and the modulation and coding scheme of the multicast traffic channel, where the second association relationship is an association relationship between the modulation and coding scheme of the multicast control channel and the modulation and coding scheme of the multicast traffic channel; and/or determining the transmission block size of the multicast traffic channel based on a third association relationship and the transmission block size of the multicast control channel, or determining the transmission block size of the multicast control channel based on a third association relationship and the transmission block size of the multicast traffic channel, where the third association relationship is an association relationship between the transmission block size of the multicast control channel and the transmission block size of the multicast traffic channel; and/or determining the quantity of repetition times of the multicast traffic channel based on a fourth association relationship and the quantity of repetition times of the multicast control channel, or determining the quantity of repetition times of the multicast control channel based on a fourth association relationship and the quantity of repetition times of the multicast traffic channel, where the fourth association relationship is an association relationship between the quantity of repetition times of the multicast control channel and the quantity of repetition times of the multicast traffic channel.

The user equipment may obtain one or more of the first association relationship, the second association relationship, the third association relationship, and the fourth association relationship based on preconfiguration or received signaling sent by the base station. The scheduling information of the multicast traffic channel may be determined based on the known scheduling information of the multicast control channel and the association relationship. Alternatively, the scheduling information of the multicast control channel may be determined based on the known scheduling information of multicast traffic channel and the association relationship.

As illustrated below, the SC-MCCH and the SC-MTCH may be transmitted by using same resource block allocation, that is, a same narrowband resource. Alternatively, the resource block allocation in the DCI used for the multicast information communication indicates a narrowband of SC-MCCH transmission, and a narrowband of SC-MTCH transmission is determined based on the narrowband of the SC-MCCH transmission. For example, the narrowband of the SC-MTCH transmission is obtained by increasing the narrowband of the SC-MCCH transmission by a narrowband shift. The narrowband shift indicates an interval between the narrowband of the SC-MTCH transmission and the narrowband of the SC-MCCH transmission, and a value of the narrowband shift is pre-specified by a system or is configured by using signaling. For example, if the resource block allocation in the DCI used for the multicast information communication indicates that the narrowband used in the SC-MCCH transmission is a narrowband n, and the narrowband shift is k, an index of the narrowband in the SC-MTCH transmission is n+k.

Further, in some embodiments of the present disclosure, the scheduling information further includes association information, where the association information indicates one or more of the first association relationship, the second association relationship, the third association relationship, and the fourth association relationship. That is, the base station may further send one or more of the first association relationship, the second association relationship, the third association relationship, and the fourth association relationship to the user equipment by using the scheduling information, so that the user equipment can obtain one or more of the first association relationship, the second association relationship, the third association relationship, and the fourth association relationship by using the scheduling information.

In some embodiments of the present disclosure, the scheduling information includes N bits, a state of each of the N bits is the same as a bit state of the indication information, and N is a positive integer greater than or equal to 1. Alternatively, the scheduling information includes N bits, a state of each of the N bits is a bit state having a fixed value, and N is a positive integer greater than or equal to 1.

As illustrated below, if it is assumed that DCI used to schedule the SC-MCCH includes 13 bits (including one bit of SC-MCCH update indication), and the bit state of the SC-MCCH update indication is 0, the DCI of the SC-MCCH includes 13 zeros. If it is assumed that DCI used to schedule the SC-MCCH includes 13 bits (including one bit of SC-MCCH update indication), and the bit state of the SC-MCCH update indication is 1, the DCI of the SC-MCCH includes 13 ones. States of N bits are the same as a bit state of the indication information, or states of N bits have a fixed value, so that repeated transmission of the indication information may be implemented or check of the DCI transmission may be improved, and reliability of the indication information communication is improved and a false alarm probability is reduced.

In some embodiments of the present disclosure, in addition to the foregoing steps, the control information communication method of the present disclosure may further include the following step:

when the multicast channel includes only the multicast traffic channel, receiving a system information block used to schedule the multicast control channel, and receiving the multicast control channel based on the scheduling performed by using the system information block; or receiving a system information block into which the multicast control channel is added, and obtaining the multicast control channel from the system information block.

When the multicast channel includes only the multicast traffic channel, the scheduling information received by the user equipment can only be used to schedule the multicast traffic channel, in this implementation scenario, this embodiment of the present disclosure further describes how to schedule the multicast control channel. For example, the multicast control channel may be scheduled by using the system information block. Alternatively, to save more communication resources, the multicast control channel is directly added into the system information block. After receiving the system information block sent by the base station, the user equipment may obtain the multicast control channel in the system information block.

It can be learned from the examples of descriptions of this embodiment of the present disclosure that, the downlink control information sent by the base station is received by using the first downlink control information format, and the indication information is obtained from the downlink control information, where the indication information is used to indicate whether a multicast control channel is updated and/or whether a multicast traffic channel is updated. The scheduling information used to schedule the multicast channel is obtained from the downlink control information, where the multicast channel includes the multicast control channel and/or the multicast traffic channel. In this embodiment of the present disclosure, both the scheduling information and the indication information are added into the downlink control information received by the user equipment, and therefore the user equipment does not need to detect a single control channel indicating whether the multicast control channel is updated, so that complexity of performing detection by the user equipment can be reduced and power consumption overheads of the user equipment can be reduced, and resource utilization can be optimized.

For better understanding and implementation of the foregoing solution of this embodiment of the present disclosure, the following provides specific descriptions by using examples. This embodiment of the present disclosure is mainly used to optimize the procedure of the multicast information communication, reduce the steps of the control information communication and/or data channel communication, and optimize resource utilization. Especially, when the multicast information is repeatedly transmitted, too many steps of the multicast information communication greatly increase resource overheads of the system and increase complexity of performing detection by the UE. Therefore, an objective to be achieved by this embodiment of the present disclosure is to optimize the procedure of the multicast information communication and reduce the steps of the control information communication and/or the data channel communication. In the prior art, neither a coverage enhancement nor repeated transmission is supported in the multicast information communication. Therefore, how to support repeated transmission of the multicast information is also an objective to be achieved by the present disclosure.

Figure 4:
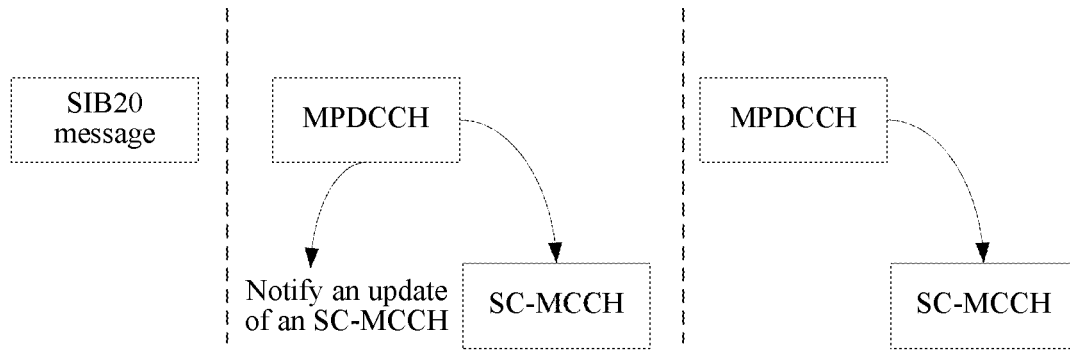
FIG. 4 is a schematic diagram of an application scenario in which an MPDCCH indicates an update of an SC-MCCH and also schedules the SC-MCCH according to an embodiment of the present disclosure.

Referring to FIG. 4, FIG. 4 is a schematic diagram of an application scenario in which an MPDCCH indicates an update of an SC-MCCH and also schedules the SC-MCCH according to an embodiment of the present disclosure. In this embodiment of the present disclosure, a physical downlink control channel for machine type communication (physical downlink control channel for MTC, MPDCCH) DCI format 6-2 may be reused to support an SC-PTM. A first RNTI is used to determine whether the DCI format 6-2 is used for a paging message or is used for a multicast information. If a DCI format 6-2 received by user equipment is not scrambled by using a P-RNTI but is scrambled by using the first RNTI, the DCI is used to notify whether an SC-MCCH is updated. In addition, when the DCI format 6-2 in the present disclosure indicates whether the SC-MCCH is updated, scheduling information of the SC-MCCH or an SC-MTCH may further be added into the DCI format 6-2. In this way, a procedure of the multicast information communication is simplified, resource utilization is optimized, complexity of performing detection by the UE is reduced, and power consumption of the UE is reduced.

For example, an existing DCI format 6-2 includes:
an identifier used to distinguish scheduling of the paging message and direct indication: if the identifier is in a state of 0, the identifier is applied to direct information indication and a reserved bit; or if the identifier is in a state of 1, the identifier is used to schedule the paging message, and the scheduling information used to schedule the paging message includes the following information:
resource block allocation:

$$\left\lceil \log_2 \left\lfloor \frac{N_{RB}^{DL}}{6} \right\rfloor \right\rceil$$

bits;
a modulation and coding scheme: three bits;
a quantity of repetitions of a PDSCH: three bits; and
a quantity of repetitions of a DCI subframe: two bits.
$N_{RB}^{DL}$ represents a quantity of resource blocks included in a downlink bandwidth. Because the DCI format 6-2 used to schedule the paging message has a small load and supports repetition of the paging message, the control channel used for the multicast information communication may be based on the DCI format 6-2. For example, when the control channel relates to the multicast information communication, the control channel is scrambled by using the first RNTI. When the control channel relates to the paging message communication, the control channel is scrambled by using the P-RNTI. The first RNTI herein is an RNTI different from the P-RNTI.

The control channel used for the multicast information communication includes an update indication of the SC-MCCH (and/or the SC-MTCH). For example, one bit in the control channel used for the multicast information communication is used to indicate whether the SC-MCCH (and/or the SC-MTCH) is updated. The control channel used for the multicast information communication may further include the scheduling information used to schedule the SC-MCCH. The DCI used to schedule the SC-MCCH may include one or more of the resource block allocation of the SC-MCCH, the modulation and coding scheme (or a transmission block size) of the SC-MCCH, a quantity of repetitions of the SC-MCCH, and the quantity of repetitions of the DCI subframe.

As shown in FIG. 4, the MPDCCH indicates an update of the SC-MCCH and also schedules the SC-MCCH, and the MPDCCH is a control channel used in an eMTC (enhanced MTC) or an FeMTC (further enhanced MTC). In this embodiment of the present disclosure, the downlink control information may be sent by using the MPDCCH. During actual application, a specific implementation of the downlink control information (DCI) may include the cases described in the following examples:

A. A specific example of DCI used to schedule an SC-MCCH is provided:
update indication of the SC-MCCH (and/or the SC-MTCH): one bit;
resource block allocation of the SC-MCCH:

$$\left\lceil \log_2 \left\lfloor \frac{N_{RB}^{DL}}{6} \right\rfloor \right\rceil$$

bits;
a modulation and coding scheme (or the transmission block size) of the SC-MCCH: three bits;
a quantity of repetitions of the SC-MCCH: three bits; and
a quantity of repetitions of a DCI subframe: two bits.

B. Another specific example of DCI used to schedule an SC-MCCH is provided:
update indication of the SC-MCCH (and/or the SC-MTCH): one bit;
resource block allocation of the SC-MCCH:

$$\left\lceil \log_2 \left\lfloor \frac{N_{RB}^{DL}}{6} \right\rfloor \right\rceil$$

bits;
a modulation and coding scheme (or the transmission block size) of the SC-MCCH: three bits; and
a quantity of repetitions of the SC-MCCH: three bits.

C. Another specific example of DCI used to schedule an SC-MCCH is provided:
update indication of the SC-MCCH (and/or the SC-MTCH): one bit;
resource block allocation of the SC-MCCH:

$$\left\lceil \log_2 \left\lfloor \frac{N_{RB}^{DL}}{6} \right\rfloor \right\rceil$$

bits;
a modulation and coding scheme (or the transmission block size) of the SC-MCCH: three bits;
a quantity of repetitions of the SC-MCCH: three bits; and
a reserved bit.
D. Another specific example of DCI used to schedule an SC-MCCH is provided:
update indication of the SC-MCCH (and/or the SC-MTCH): one bit;
resource block allocation of the SC-MCCH:

$$\left\lceil \log_2 \left\lfloor \frac{N_{RB}^{DL}}{6} \right\rfloor \right\rceil$$

bits;
a modulation and coding scheme (or the transmission block size) of the SC-MCCH: three bits; and
a reserved bit.
E. Another specific example of DCI used to schedule an SC-MCCH is provided:
update indication of the SC-MCCH (and/or the SC-MTCH): one bit;
a quantity of repetitions of the SC-MCCH: three bits; and
a reserved bit (optional).

Optionally, in this embodiment, when the SC-MCCH update indication indicates that the SC-MCCH is not updated, another field in the DCI scheduling the multicast includes one or more of the resource block allocation of the SC-MTCH, the modulation and coding scheme (or the transmission block size) of the SC-MTCH, the quantity of repetitions of the SC-MTCH, and the quantity of repetitions of the DCI subframe. When the SC-MCCH update indication indicates that the SC-MCCH is updated, the another field in the DCI scheduling the multicast includes one or more of the resource block allocation of the SC-MCCH, the modulation and coding scheme (or the transmission block size) of the SC-MCCH, the quantity of repetitions of the SC-MCCH, and the quantity of repetitions of the DCI subframe.

In some other embodiments of the present disclosure, the control channel used for the multicast information communication includes an update indication of the SC-MCCH (and/or the SC-MTCH). For example, one bit in the control channel used for the multicast information communication is used to indicate whether the SC-MCCH (and/or the SC-MTCH) is updated.

The control channel used for the multicast information communication may further include the scheduling information used to schedule the SC-MTCH. The DCI used to schedule the SC-MTCH may include one or more of the resource block allocation of the SC-MTCH, the modulation and coding scheme (or the transmission block size) of the SC-MTCH, the quantity of repetitions of the SC-MTCH, and the quantity of repetitions of the DCI subframe. During actual application, a specific implementation of the DCI may include the cases described in the following examples:

A. A specific example of DCI used to schedule an SC-MTCH is provided:
update indication of the SC-MCCH (and/or the SC-MTCH): one bit;
resource block allocation of the SC-MTCH:

$$\left\lceil \log_2 \left\lfloor \frac{N_{RB}^{DL}}{6} \right\rfloor \right\rceil$$

bits;
a modulation and coding scheme (or the transmission block size) of the SC-MTCH: three bits;
a quantity of repetitions of the SC-MTCH: three bits; and
a quantity of repetitions of a DCI subframe: two bits.
B. Another specific example of DCI used to schedule an SC-MTCH is provided:
update indication of the SC-MCCH (and/or the SC-MTCH): one bit;
resource block allocation of the SC-MTCH:

$$\left\lceil \log_2 \left\lfloor \frac{N_{RB}^{DL}}{6} \right\rfloor \right\rceil$$

bits;
a modulation and coding scheme (or the transmission block size) of the SC-MTCH: three bits; and
a quantity of repetitions of the SC-MTCH: three bits.
C. Another specific example of DCI used to schedule an SC-MTCH is provided:
update indication of the SC-MCCH (and/or the SC-MTCH): one bit;
resource block allocation of the SC-MTCH:

$$\left\lceil \log_2 \left\lfloor \frac{N_{RB}^{DL}}{6} \right\rfloor \right\rceil$$

bits;
a modulation and coding scheme (or the transmission block size) of the SC-MTCH: three bits;
a quantity of repetitions of the SC-MTCH: three bits; and
a reserved bit.
D. Another specific example of DCI used to schedule an SC-MTCH is provided:
update indication of the SC-MCCH (and/or the SC-MTCH): one bit;
resource block allocation of the SC-MTCH:

$$\left\lceil \log_2 \left\lfloor \frac{N_{RB}^{DL}}{6} \right\rfloor \right\rceil$$

bits;
a modulation and coding scheme (or the transmission block size) of the SC-MTCH: three bits;
a quantity of repetitions of the SC-MTCH: three bits; and
a reserved bit.

E. Another specific example of DCI used to schedule an SC-MTCH is provided:

update indication of the SC-MCCH (and/or the SC-MTCH): one bit;
a quantity of repetitions of the SC-MTCH: three bits; and
a reserved bit (optional).

In some other embodiments of the present disclosure, the control channel used for the multicast information communication includes an update indication of the SC-MCCH (and/or the SC-MTCH). For example, one bit in the control channel used for the multicast information communication is used to indicate whether the SC-MCCH (and/or the SC-MTCH) is updated. The control channel used for the multicast information communication may further include the scheduling information used to schedule the SC-MCCH and the SC-MTCH. The DCI used to schedule the SC-MCCH and the SC-MTCH may include one or more of the resource block allocation of the SC-MCCH, the modulation and coding scheme (or the transmission block size) of the SC-MCCH, the quantity of repetitions of the SC-MCCH, the resource block allocation of the SC-MTCH, the modulation and coding scheme (or the transmission block size) of the SC-MTCH, the quantity of repetitions of the SC-MTCH, and the quantity of repetitions of the DCI subframe.

Case 1: Multicast DCI Indicates the Resource Block Allocation of the SC-MCCH and/or the SC-MTCH.

The SC-MCCH and the SC-MTCH may be transmitted by using same resource block allocation, that is, a same narrowband resource. Alternatively, the resource block allocation in the DCI used for the multicast information communication indicates a narrowband of SC-MCCH transmission, and a narrowband of SC-MTCH transmission is determined based on the narrowband of the SC-MCCH transmission. For example, the narrowband of the SC-MTCH transmission is obtained by increasing the narrowband of the SC-MCCH transmission by a narrowband shift. The narrowband shift indicates an interval between the narrowband of the SC-MTCH transmission and the narrowband of the SC-MCCH transmission, and a value of the narrowband shift is pre-specified by a system or is configured by using signaling. For example, if the resource block allocation in the DCI used for the multicast information communication indicates that the narrowband used in the SC-MCCH transmission is a narrowband n, and the narrowband shift is k, an index of the narrowband in the SC-MTCH transmission is n+k.

Similarly, the resource block allocation in the DCI used for the multicast information communication indicates a narrowband of SC-MTCH transmission, and a narrowband of SC-MCCH transmission is determined based on the narrowband of the SC-MTCH transmission. For example, the narrowband of the SC-MCCH transmission is obtained by increasing the narrowband of the SC-MTCH transmission by a narrowband shift. The narrowband shift indicates an interval between the narrowband of the SC-MCCH transmission and the narrowband of the SC-MTCH transmission, and a value of the narrowband shift is pre-specified by a system or is configured by using signaling. For example, the resource block allocation in the DCI used for the multicast information communication indicates that the narrowband used in the SC-MTCH transmission is a narrowband n, the narrowband shift is k, and an index of the narrowband in the SC-MCCH transmission is n+k.

Case 2: Multicast DCI Indicates the Modulation and Coding Scheme (or the Transmission Block Size) of the SC-MCCH and/or the SC-MTCH.

Optionally, the DCI used for the multicast information communication further indicates the modulation and coding scheme (or the transmission block size) of the SC-MCCH and/or the SC-MTCH. In DCI used for the multicast information communication, the modulation and coding scheme (or the transmission block size) of the SC-MCCH and the SC-MTCH may be independently indicated. Alternatively, in DCI used for the multicast information communication, the modulation and coding scheme (or the transmission block size) of the SC-MCCH transmission may be indicated, and the modulation and coding scheme (or the transmission block size) of the SC-MTCH is determined based on the modulation and coding scheme (or the transmission block size) of the SC-MCCH transmission. Alternatively, in DCI used for the multicast information communication, the modulation and coding scheme (or the transmission block size) of the SC-MTCH transmission may be indicated, and the modulation and coding scheme (or the transmission block size) of the SC-MCCH is determined based on the modulation and coding scheme (or the transmission block size) of the SC-MTCH transmission. For example, there is a relationship between the modulation and coding scheme (or the transmission block size) of the SC-MTCH transmission and the modulation and coding scheme (or the transmission block size) of the SC-MCCH transmission.

Case 3: Multicast DCI Indicates the Quantity of Repetitions of the SC-MCCH and/or the SC-MTCH.

Optionally, the DCI used for the multicast information communication further indicates the quantity of repetitions of the SC-MCCH and/or the SC-MTCH transmission. In DCI used for the multicast information communication, the quantity of repetitions of the SC-MCCH and the quantity of repetitions of the SC-MTCH transmission may be independently indicated. Alternatively, in DCI used for the multicast information communication, the quantity of repetitions of the SC-MCCH transmission may be indicated, and the quantity of repetitions of the SC-MTCH transmission is determined based on the quantity of repetitions of the SC-MCCH transmission. Alternatively, in DCI used for the multicast information communication, the quantity of repetitions of the SC-MTCH transmission may be indicated, and the quantity of repetitions of the SC-MCCH transmission is determined based on the quantity of repetitions of the SC-MTCH transmission. For example, there is a relationship between the quantity of repetitions of the SC-MTCH transmission and the quantity of repetitions of the SC-MCCH transmission. When the quantity of repetitions of the SC-MCCH (or the SC-MTCH) transmission is known, the quantity of repetitions of the SC-MTCH (or the SC-MCCH) transmission may be determined based on the quantity of repetitions of the SC-MCCH (or the SC-MTCH) transmission and the known relationship.

For example, a specific example of DCI used to schedule an SC-MCCH is provided:

update indication of the SC-MCCH (and/or the SC-MTCH): one bit;
resource block allocation of the SC-MCCH:

$$\left\lceil \log_2 \left\lfloor \frac{N_{RB}^{DL}}{6} \right\rfloor \right\rceil$$

bits;
a narrowband shift of the SC-MTCH: n bits;
a modulation and coding scheme (or the transmission block size) of the SC-MCCH: a bits;
a modulation and coding scheme (or the transmission block size) of the SC-MTCH: b bits; and a quantity of repetitions of the SC-MTCH: c bits.

In some other embodiments of the present disclosure, the control channel used for the multicast information communication includes an update indication of the SC-MCCH (or the SC-MTCH). For example, one bit in the control channel used for the multicast information communication is used to indicate whether the SC-MCCH (or the SC-MTCH) is updated. Another bit in the control channel used for the multicast information communication is repetition of a bit indicating the update of the SC-MCCH (or the SC-MTCH) or is a reserved bit. During actual application, a specific implementation of the DCI may include the cases described in the following examples:

A. A specific example of DCI used to schedule an SC-MCCH is provided:

SC-MCCH update indication: one bit; and repetition of the SC-MCCH update indication: n bits of one or n bits of zero.

The update indication is one bit, and is 1 or 0. Other bits repeat the update bit, i.e., the bits are all ones or all zeros. The reserved bit is in a state same as the bit state of the SC-MCCH update indication. If it is assumed that DCI used to schedule the SC-MCCH includes 13 bits (including one bit of SC-MCCH update indication), and the bit state of the SC-MCCH update indication is 0, the DCI of the SC-MCCH includes 13 zeros. If it is assumed that DCI used to schedule the SC-MCCH includes 13 bits (including one bit of SC-MCCH update indication), and the bit state of the SC-MCCH update indication is 1, the DCI of the SC-MCCH includes 13 ones.

B. Another specific example of DCI used to schedule an SC-MCCH is provided:

SC-MCCH update indication: one bit; and a reserved bit: n bits.

C. DCI includes n bits, and a specific example of DCI used to schedule an SC-MCCH is provided:

SC-MCCH update indication: n bits, namely n bits of one or n bits of zero.

Figure 5:
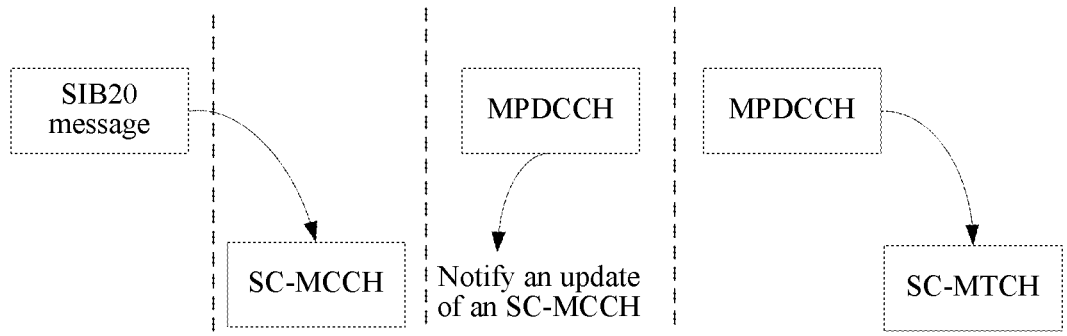
FIG. 5 is a schematic diagram of an application scenario in which an SC-MCCH is scheduled by using a SIB20 message according to an embodiment of the present disclosure.

In some embodiments of the present disclosure, the SC-MCCH may be scheduled by using a SIB20 or a SIB1 (or another SIB). As shown in FIG. 5, a first step is scheduling the SC-MCCH in the SIB20, a second step is notifying information about the update of the SC-MCCH in the MPDCCH, and a third step is scheduling the SC-MTCH by using the MPDCCH. The DCI format of the MPDCCH for scheduling the SC-MTCH is described in the foregoing embodiments, and details are not described herein again.

Figure 6:
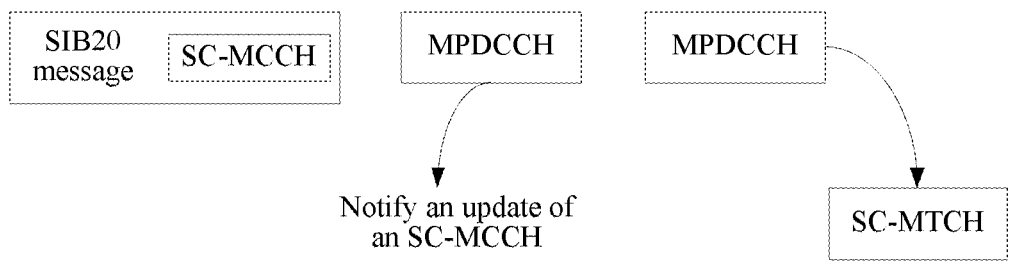
FIG. 6 is a schematic diagram of an application scenario in which a SIB20 message includes an SC-MCCH according to an embodiment of the present disclosure.

As shown in FIG. 6, a first step is including the SC-MCCH in the SIB20, a second step is notifying information about the update of the SC-MCCH in the MPDCCH, and a third step is scheduling the SC-MTCH by using the MPDCCH. The DCI format of the MPDCCH for scheduling the SC-MTCH is described in the foregoing embodiments, and details are not described herein again.

Certainly, optionally, the first step is scheduling the SC-MCCH in the SIB20, and the second step is notifying information about the update of the SC-MCCH in the MPDCCH and scheduling the SC-MTCH. The DCI format of the MPDCCH for scheduling the SC-MTCH is described in the foregoing embodiments, and details are not described herein again. Alternatively, the first step is including the SC-MCCH in the SIB20, and the second step is notifying information about the update of the SC-MCCH in the MPDCCH and scheduling the SC-MTCH. The DCI format of the MPDCCH for scheduling the SC-MTCH is described in the foregoing embodiments, and details are not described herein again.

In this embodiment of the present disclosure, the MPDCCH DCI format 6-2 is reused by scrambling by using the first RNTI, to support the SC-PTM transmission. There is one bit in the MPDCCH used to indicate whether the SC-MCCH information is updated. A quantity of bits included in the DCI format 6-2 is even less, the DCI format 6-2 is reused to dynamically indicate the update of the SC-MCCH and the scheduling of the SC-MCCH. Therefore, a quantity of times of sending the MPDCCH by a base station and a quantity of times of detecting the MPDCCH by UE are reduced, a coverage enhancement of the SC-PTM is supported, complexity of performing detection by the UE is reduced, power consumption overheads of the UE is reduced, resource utilization is optimized, and an information communication delay is reduced.

It should be noted that, for simple description, the foregoing method embodiments are represented as a series of actions, but persons skilled in the art should know that the present disclosure is not limited to the described order of the actions because some steps may be performed in another order or performed simultaneously according to the present disclosure. In addition, persons skilled in the art should also know that all the embodiments described in this specification are exemplary embodiments, and the related actions and modules are not necessarily required in the present disclosure.

To better implement the solutions of the embodiments of the present disclosure, the following further provides related apparatuses for implementing the solutions.

Figure 7:
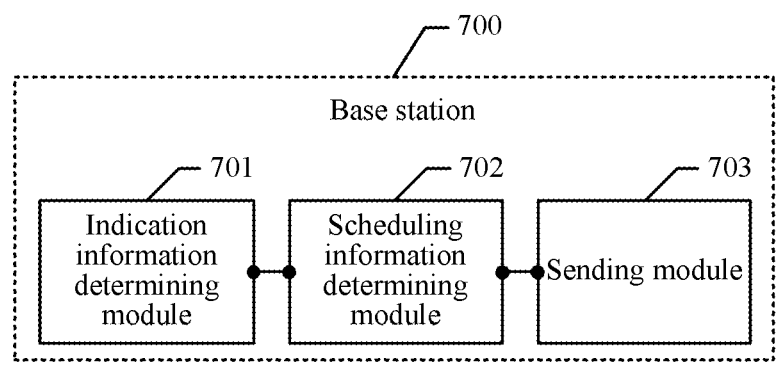
FIG. 7 is a schematic structural composition diagram of a base station according to an embodiment of the present disclosure.

Referring to FIG. 7, an embodiment of the present disclosure provides a base station 700. The base station 700 may include an indication information determining module 701, a scheduling information determining module 702, and a sending module 703.

The indication information determining module 701 is configured to add indication information into downlink control information, where the indication information is used to indicate whether a multicast control channel is updated and/or whether a multicast traffic channel is updated.

The scheduling information determining module 702 is configured to add scheduling information used to schedule a multicast channel into the downlink control information, where the multicast channel includes the multicast control channel and/or the multicast traffic channel.

The sending module 703 is configured to send the downlink control information to user equipment by using a first downlink control information format.

In some embodiments of the present disclosure, the first downlink control information format used by the sending module 703 includes a downlink control information format DCI format 6-2. Alternatively, the first downlink control information format includes a downlink control information format supported by machine type communication MTC user equipment, and the MTC user equipment includes bandwidth-reduced user equipment and/or coverage-enhanced user equipment.

In some embodiments of the present disclosure, the indication information obtained by the indication information determining module 701 includes first information occupying one bit, and when the first information is in a state of 1, it indicates that the multicast control channel is updated, or when the first information is in a state of 0, it indicates that the multicast control channel is not updated; or the indication information includes second information occupying one bit, and when the second information is in a state of 0, it indicates that the multicast control channel is updated, or when the second information is in a state of 1, it indicates that the multicast control channel is not updated.

In some embodiments of the present disclosure, the scheduling information obtained by the scheduling information determining module 702 includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

In some embodiments of the present disclosure, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

In some embodiments of the present disclosure, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

In some embodiments of the present disclosure, there is a first association relationship between the resource block allocation of the multicast control channel and the resource block allocation of the multicast traffic channel; and/or there is a second association relationship between the modulation and coding scheme of the multicast control channel and the modulation and coding scheme of the multicast traffic channel; and/or there is a third association relationship between the transmission block size of the multicast control channel and the transmission block size of the multicast traffic channel; and/or there is a fourth association relationship between the quantity of repetitions of the multicast control channel and the quantity of repetitions of the multicast traffic channel.

In some embodiments of the present disclosure, the scheduling information obtained by the scheduling information determining module 702 further includes association information, where the association information indicates one or more of the first association relationship, the second association relationship, the third association relationship, and the fourth association relationship.

In some embodiments of the present disclosure, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

In some embodiments of the present disclosure, the sending module 703 is further configured to: when the multicast channel includes only the multicast traffic channel, send, to the user equipment, a system information block used to schedule the multicast control channel, or send, to the user equipment, a system information block into which the multicast control channel is added.

Figure 8:
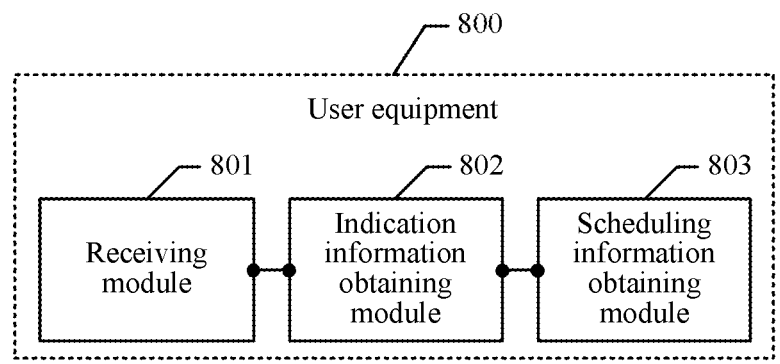
FIG. 8 is a schematic structural composition diagram of user equipment according to an embodiment of the present disclosure.

Referring to FIG. 8, an embodiment of the present disclosure provides user equipment 800. The user equipment 800 may include a receiving module 801, an indication information obtaining module 802, and a scheduling information obtaining module 803.

The receiving module 801 is configured to receive, by using a first downlink control information format, downlink control information sent by a base station.

The indication information obtaining module 802 is configured to obtain indication information from the downlink control information, where the indication information is used to indicate whether a multicast control channel is updated and/or whether a multicast traffic channel is updated.

The scheduling information obtaining module 803 is configured to obtain, from the downlink control information, scheduling information used to schedule a multicast channel, where the multicast channel includes the multicast control channel and/or the multicast traffic channel.

In some embodiments of the present disclosure, the first downlink control information format used by the receiving module 801 includes a downlink control information format DCI format 6-2. Alternatively, the first downlink control information format includes a downlink control information format supported by machine type communication MTC user equipment, and the MTC user equipment includes bandwidth-reduced user equipment and/or coverage-enhanced user equipment.

In some embodiments of the present disclosure, the indication information obtained by the indication information obtaining module 802 includes first information occupying one bit, and when the first information is in a state of 1, it indicates that the multicast control channel is updated, or when the first information is in a state of 0, it indicates that the multicast control channel is not updated; or the indication information includes second information occupying one bit, and when the second information is in a state of 0, it indicates that the multicast control channel is updated, or when the second information is in a state of 1, it indicates that the multicast control channel is not updated.

In some embodiments of the present disclosure, the scheduling information obtained by the scheduling information obtaining module 803 includes one or more of information about resource block allocation of the multicast control channel, information about a modulation and coding scheme of the multicast control channel, information about a transmission block size of the multicast control channel, information about a quantity of repetitions of the multicast control channel, and a quantity of repetitions of the downlink control information; and/or the scheduling information includes one or more of information about resource block allocation of the multicast traffic channel, information about a modulation and coding scheme of the multicast traffic channel, information about a transmission block size of the multicast traffic channel, information about a quantity of repetitions of the multicast traffic channel, and a quantity of repetitions of the downlink control information.

In some embodiments of the present disclosure, the scheduling information includes information about the resource block allocation of the multicast control channel, information about the modulation and coding scheme of the multicast control channel, information about the quantity of repetitions of the multicast control channel, and the quantity of repetitions of the downlink control information; or the scheduling information includes information about the resource block allocation of the multicast control channel, information about the transmission block size of the multicast control channel, information about the quantity of repetitions of the multicast control channel, and the quantity of repetitions of the downlink control information; or the scheduling information includes information about the resource block allocation of the multicast control channel, information about the modulation and coding scheme of the multicast control channel, and information about the quantity of repetitions of the multicast control channel; or the scheduling information includes information about the resource block allocation of the multicast control channel, information about the transmission block size of the multicast control channel, and information about the quantity of repetitions of the multicast control channel.

In some embodiments of the present disclosure, the scheduling information includes information about the resource block allocation of the multicast traffic channel, information about the modulation and coding scheme of the multicast traffic channel, information about the quantity of repetitions of the multicast traffic channel, and the quantity of repetitions of the downlink control information; or the scheduling information further includes information about the resource block allocation of the multicast traffic channel, information about the transmission block size of the multicast traffic channel, information about the quantity of repetitions of the multicast traffic channel, and the quantity of repetitions of the downlink control information; or the scheduling information further includes information about the resource block allocation of the multicast traffic channel, information about the modulation and coding scheme of the multicast traffic channel, and information about the quantity of repetitions of the multicast traffic channel; or the scheduling information further includes information about the resource block allocation of the multicast traffic channel, information about the transmission block size of the multicast traffic channel, and information about the quantity of repetitions of the multicast traffic channel.

In some embodiments of the present disclosure, the scheduling information obtaining module 803 is specifically configured to: determine the resource block allocation of the multicast traffic channel based on a first association relationship and the resource block allocation of the multicast control channel, or determine the resource block allocation of the multicast control channel based on a first association relationship and the resource block allocation of the multicast traffic channel, where the first association relationship is an association relationship between the resource block allocation of the multicast control channel and the resource block allocation of the multicast traffic channel; and/or determine the modulation and coding scheme of the multicast traffic channel based on a second association relationship and the modulation and coding scheme of the multicast control channel, or determine the modulation and coding scheme of the multicast control channel based on a second association relationship and the modulation and coding scheme of the multicast traffic channel, where the second association relationship is an association relationship between the modulation and coding scheme of the multicast control channel and the modulation and coding scheme of the multicast traffic channel; and/or determine the transmission block size of the multicast traffic channel based on a third association relationship and the transmission block size of the multicast control channel, or determine the transmission block size of the multicast control channel based on a third association relationship and the transmission block size of the multicast traffic channel, where the third association relationship is an association relationship between the transmission block size of the multicast control channel and the transmission block size of the multicast traffic channel; and/or determine the transmission block size of the quantity of repetition times based on a fourth association relationship and the quantity of repetition times of the multicast control channel, or determine the transmission block size of the quantity of repetition times based on a fourth association relationship and the quantity of repetition times of the multicast traffic channel, where the fourth association relationship is an association relationship between the quantity of repetition times of the multicast control channel and the quantity of repetition times of the multicast traffic channel.

In some embodiments of the present disclosure, the scheduling information further includes association information, where the association information indicates one or more of the first association relationship, the second association relationship, the third association relationship, and the fourth association relationship.

In some embodiments of the present disclosure, the scheduling information includes N bits, a state of each of the N bits is the same as a bit state of the indication information, and N is a positive integer greater than or equal to 1; or the scheduling information includes N bits, a state of each of the N bits is a bit state having a fixed value, and N is a positive integer greater than or equal to 1.

In some embodiments of the present disclosure, the receiving module 801 is further configured to: when the multicast channel includes only the multicast traffic channel, receive a system information block used to schedule the multicast control channel, and receive the multicast control channel based on the scheduling performed by using the system information block; or receive a system information block into which the multicast control channel is added, and obtain the multicast control channel from the system information block.

It should be noted that, because the content such as information exchange between and an execution process of modules/units of the foregoing apparatus belongs to the same conception as the method embodiment of the present disclosure, it brings the same technical effects as the method embodiment of the present disclosure. For details, refer to the descriptions in the foregoing method embodiment of the present disclosure, which is not further described herein.

An embodiment of the present disclosure further provides a computer storage medium. The computer storage medium stores a program, and the program performs some or all of the steps recorded in the foregoing method embodiments.

Figure 9:
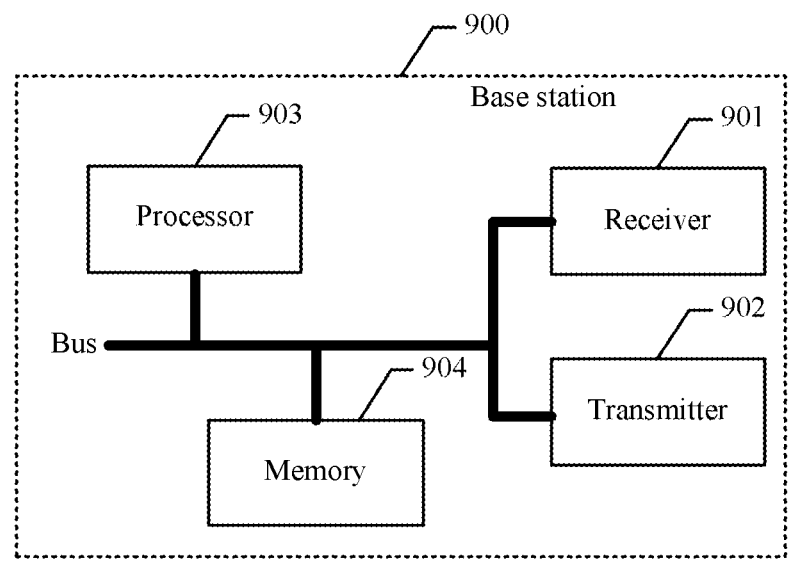
FIG. 9 is a schematic structural composition diagram of another base station according to an embodiment of the present disclosure.

The following describes another base station provided by an embodiment of the present disclosure. Referring to FIG. 9, the base station 900 includes:

a receiver 901, a transmitter 902, a processor 903, and a memory 904 (there may be one or more processors 903 in the base station 900, and that there is one processor in the base station 900 is used as an example in FIG. 9). In some embodiments of the present disclosure, the receiver 901, the transmitter 902, the processor 903, and the memory 904 may be connected by using a bus or in another manner. Connection by using the bus is used as an example in FIG. 9.

The memory 904 may include a read-only memory and a random access memory, and provides an instruction and data to the processor 903. A part of the memory 904 may further include a non-volatile random access memory (NVRAM). The memory 904 stores an operating system, an operation instruction, an executable module, or a data structure, or a subset thereof, or an extension set thereof. The operation instruction may include various operation instructions, to implement various operations. The operating system may include various system programs, configured to implement various fundamental services and process hardware-based tasks.

The processor 903 controls an operation of the base station, and the processor 903 may further be referred to as a central processing unit (CPU). During specific application, all components of the base station are coupled together by using a bus system. In addition to a data bus, the bus system may further include a power source bus, a control bus, a state signal bus, and the like. However, for clear description, various buses are referred to as a bus system in the drawings.

The method disclosed in the foregoing embodiments of the present disclosure may be applied to the processor 903, or in other words, may be implemented by the processor 903. The processor 903 may be an integrated circuit chip and has a signal processing capability. In an implementation process, the steps in the foregoing methods may be implemented by using a hardware integrated logical circuit in the processor 903, or an instruction in the form of software. The processor 903 may be a general-purpose processor, a digital signal processor (DSP), an application-specific integrated circuit (ASIC), a field-programmable gate array (FPGA), or another programmable logic component, a discrete gate or a transistor logic component, or a discrete hardware component, and may implement or execute the methods, steps, and logical block diagrams disclosed in the embodiments of the present disclosure. The general-purpose processor may be a microprocessor, or the processor may be any conventional processor, or the like. Steps of the methods disclosed with reference to the embodiments of the present disclosure may be directly executed and accomplished by using a hardware decoding processor, or may be executed and accomplished by using a combination of hardware and software modules in the decoding processor. The software modules may be located in a mature storage medium in the field, such as a random access memory, a flash memory, a read-only memory, a programmable read-only memory, an electrically erasable programmable memory, or a register. The storage medium is located in the memory 904, and the processor 903 reads information in the memory 904 and completes the steps of the foregoing methods in combination with hardware of the processor 903.

In this embodiment of the present disclosure, the processor 903 is configured to perform the method steps shown in FIG. 2.

Figure 10:
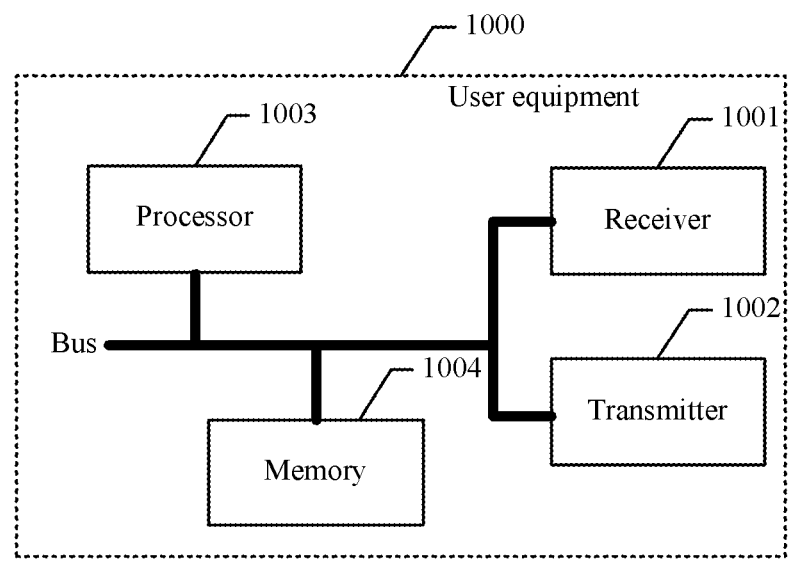
FIG. 10 is a schematic structural composition diagram of another user equipment according to an embodiment of the present disclosure.

The following describes another user equipment provided by an embodiment of the present disclosure. Referring to FIG. 10, the user equipment 1000 includes:

a receiver 1001, a transmitter 1002, a processor 1003, and a memory 1004 (there may be one or more processors 1003 in the user equipment 1000, and that there is one processor in the user equipment 1000 is used as an example in FIG. 10). In some embodiments of the present disclosure, the receiver 1001, the transmitter 1002, the processor 1003, and the memory 1004 may be connected by using a bus or in another manner. Connection by using the bus is used as an example in FIG. 10.

The memory 1004 may include a read-only memory and a random access memory, and provides an instruction and data to the processor 1003. A part of the memory 1004 may further include an NVRAM. The memory 1004 stores an operating system, an operation instruction, an executable module, or a data structure, or a subset thereof, or an extension set thereof. The operation instruction may include various operation instructions, to implement various operations. The operating system may include various system programs, configured to implement various fundamental services and process hardware-based tasks.

The processor 1003 controls an operation of the user equipment, and the processor 1003 may further be referred to as a CPU. During specific application, all components of the user equipment are coupled together by using a bus system. In addition to a data bus, the bus system further includes a power source bus, a control bus, a state signal bus, and the like. However, for clear description, various buses are referred to as a bus system in the drawings.

The method disclosed in the foregoing embodiments of the present disclosure may be applied to the processor 1003, or in other words, may be implemented by the processor 1003. The processor 1003 may be an integrated circuit chip and has a signal processing capability. In an implementation process, the steps in the foregoing methods may be implemented by using a hardware integrated logical circuit in the processor 1003, or an instruction in the form of software. The foregoing processor 1003 may be a general-purpose processor, a DSP, an ASIC, an FPGA, or another programmable logic component, a discrete gate or a transistor logic component, or a discrete hardware component, and may implement or execute the methods, steps, and logical block diagrams disclosed in the embodiments of the present disclosure. The general-purpose processor may be a microprocessor, or the processor may be any conventional processor, or the like. Steps of the methods disclosed with reference to the embodiments of the present disclosure may be directly executed and accomplished by using a hardware decoding processor, or may be executed and accomplished by using a combination of hardware and software modules in the decoding processor. The software modules may be located in a mature storage medium in the field, such as a random access memory, a flash memory, a read-only memory, a programmable read-only memory, an electrically erasable programmable memory, or a register. The storage medium is located in the memory 1004, and the processor 1003 reads information in the memory 1004 and completes the steps of the foregoing methods in combination with hardware of the processor 1003.

In this embodiment of the present disclosure, the processor 1003 is configured to perform the method steps shown in FIG. 3.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communications connections with each other, which may be specifically implemented as one or more communications buses or signal cables. Persons of ordinary skill in the art may understand and implement the embodiments of the present disclosure without creative efforts.

Based on the description of the foregoing implementations, persons skilled in the art may clearly understand that the present disclosure may be implemented by software in addition to necessary universal hardware, or certainly by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be of various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in various embodiments of the present disclosure.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A control information communication method using downlink control information (DCI) format 6-2 for paging and for multicast, the method comprising:
formatting a DCI using the DCI format 6-2;
scrambling the DCI by a paging radio network temporary identifier (P-RNTI) based on the DCI being used for paging; and
scrambling the DCI by a single cell radio network temporary identifier (SC-RNTI) based on the DCI being used for multicast,
wherein the DCI used for multicast comprises indication information and scheduling information,
wherein the indication information is used to indicate whether a multicast control channel is updated,
wherein the scheduling information is used to schedule a multicast control channel,
wherein the scheduling information comprises information about (1) resource block allocation of the multicast control channel, (2) a modulation and coding scheme of the multicast control channel, (3) a quantity of repetitions of the multicast control channel, and (4) a quantity of repetitions of the DCI,
wherein the information about the resource block allocation of the multicast control channel occupies $$\left\lceil \log_2 \left\lfloor \frac{N_{RB}^{DL}}{6} \right\rfloor \right\rceil$$

bit positions in the DCI format 6-2,
wherein the information about the modulation and coding scheme of the multicast control channel occupies three bit positions in the DCI format 6-2,
wherein the information about the quantity of repetitions of the multicast control channel occupies three bit positions in the DCI format 6-2,
wherein the information about the quantity of repetitions of the DCI occupies two bit positions in the DCI format 6-2,
wherein $N_{RB}^{DL}$ refers to a quantity of resource blocks included in a downlink bandwidth,
wherein the resource block allocation in the DCI indicates a narrowband of a single-cell multicast control channel (SC-MCCH) transmission, and
wherein a narrowband of a single-cell multicast traffic channel (SC-MTCH) transmission is determined based on the narrowband of the SC-MCCH transmission; and
sending the DCI to user equipment.

2. The method according to claim 1, wherein the indication information occupies one bit.

3. The method according to claim 2, wherein the bit with a state of 1 indicates that the multicast control channel is updated or the bit with a state of 0 indicates that the multicast control channel is not updated.

4. A control information communication method comprising:
receiving, by using downlink control information (DCI) format 6-2, a DCI from a base station, wherein the DCI format 6-2 is used for paging and for multicast; and
determining whether the DCI is used for paging or for multicast,
wherein the DCI is determined to be used for paging based on the DCI being scrambled by a paging radio network temporary identifier (P-RNTI), wherein the DCI is determined to be used for multicast based on the DCI being scrambled by a single cell radio network temporary identifier (SC-RNTI),
wherein the DCI used for multicast comprises indication information and scheduling information,
wherein the indication information is used to indicate whether a multicast control channel is updated,
wherein the scheduling information is used to schedule a multicast control channel,
wherein the scheduling information comprises information about (1) resource block allocation of the multicast control channel, (2) a modulation and coding scheme of the multicast control channel, (3) a quantity of repetitions of the multicast control channel, and (4) a quantity of repetitions of the DCI,
wherein the information about the resource block allocation of the multicast control channel occupies $$\left\lceil \log_2 \left\lfloor \frac{N_{RB}^{DL}}{6} \right\rfloor \right\rceil$$

bit positions in the DCI format 6-2,
wherein the information about the modulation and coding scheme of the multicast control channel occupies three bit positions in the DCI format 6-2,
wherein the information about the quantity of repetitions of the multicast control channel occupies three bit positions in the DCI format 6-2,
wherein the information about the quantity of repetitions of the DCI occupies two bit positions in the DCI format 6-2,
wherein $N_{RB}^{DL}$ refers to a quantity of resource blocks included in a downlink bandwidth,
wherein the resource block allocation in the DCI indicates a narrowband of a single-cell multicast control channel (SC-MCCH) transmission, and
wherein a narrowband of a single-cell multicast traffic channel (SC-MTCH) transmission is determined based on the narrowband of the SC-MCCH transmission.

5. The method according to claim 4, wherein the indication information occupies one bit.

6. The method according to claim 5, wherein the bit with a state of 1 indicates that the multicast control channel is updated or the bit with a state of 0 indicates that the multicast control channel is not updated.

7. An apparatus comprising at least one processor, a memory storing executable instructions for execution by the at least one processor, a receiver and a transmitter, wherein when the at least one processor executes the instructions, the at least one processor cooperates with the receiver and transmitter to provide at least the following operations:
formatting a downlink control information (DCI) using a DCI format 6-2;
scrambling the DCI by a paging radio network temporary identifier (P-RNTI) based on the DCI being used for paging; and
scrambling the DCI by a single cell radio network temporary identifier (SC-RNTI) based on the DCI being used for multicast,
wherein the DCI used for multicast comprises indication information and scheduling information,
wherein the indication information is used to indicate whether a multicast control channel is updated,
wherein the scheduling information is used to schedule a multicast control channel,
wherein the scheduling information comprises information about (1) resource block allocation of the multicast control channel, (2) a modulation and coding scheme of the multicast control channel, (3) a quantity of repetitions of the multicast control channel, and (4) a quantity of repetitions of the DCI,
wherein the information about the resource block allocation of the multicast control channel occupies $$\left\lceil \log_2 \left\lfloor \frac{N_{RB}^{DL}}{6} \right\rfloor \right\rceil$$

bit positions in the DCI format 6-2,
wherein the information about the modulation and coding scheme of the multicast control channel occupies three bit positions in the DCI format 6-2,
wherein the information about the quantity of repetitions of the multicast control channel occupies three bit positions in the DCI format 6-2,
wherein the information about the quantity of repetitions of the DCI occupies two bit positions in the DCI format 6-2,
wherein $N_{RB}^{DL}$ refers to a quantity of resource blocks included in a downlink bandwidth,
wherein the resource block allocation in the DCI indicates a narrowband of a single-cell multicast control channel (SC-MCCH) transmission, and
wherein a narrowband of a single-cell multicast traffic channel (SC-MTCH) transmission is determined based on the narrowband of the SC-MCCH transmission; and
sending the DCI to user equipment.

8. The apparatus according to claim 7, wherein the indication information occupies one bit.

9. The apparatus according to claim 8, wherein the bit with a state of 1 indicates that the multicast control channel is updated or the bit with a state of 0 indicates that the multicast control channel is not updated.

10. A non-transitory computer-readable storage medium comprising instructions which, when executed by a base station, cause the base station to carry out the method according to claim 1.

11. A non-transitory computer-readable storage medium comprising instructions which, when executed by a user equipment, cause the user equipment to carry out the method according to claim 4.

* * * * *